United States Patent Office 2,832,775
Patented Apr. 29, 1958

2,832,775

2 - HALO - 10 - (N' - ALKOXYALKYL - N' - ALKYL-AMINOALKYL) PHENOTHIAZINES AND CORRESPONDING ALKENYL DERIVATIVES

John W. Cusic and Edward A. Brown, Skokie, Ill., assignors to G. D. Searle & Co., Chicago, Ill., a corporation of Delaware No Drawing. Application April 3, 1956
Serial No. 575,710

6 Claims. (Cl. 260—243)

The present invention relates to a new group of heterocyclic ethers and, more particularly, to 2-halo-10-(N'-alkoxyalkyl-N'-alkylaminoalkyl)phenothiazines and the corresponding alkenyl derivatives which can be represented as the bases of the structural formula

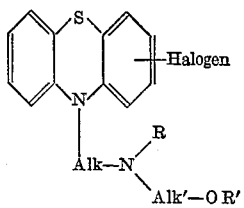

and the pharmaceutically acceptable non-toxic salts thereof, wherein the halogen atom is preferably of an atomic weight less than 100, Alk and Alk' are lower alkylene radicals and R and R' are members of the class consisting of lower alkyl and lower alkenyl radicals.

In the foregoing structural formula the radicals Alk and Alk' represent bivalent saturated aliphatic hydrocarbon radicals derived from straight and branched chain hydrocarbons such as methylene, ethylene, propylene, butylene, amylene, hexylene or polymethylene radicals such as trimethylene, tetramethylene, pentamethylene and hexamethylene. The radicals R and R' can represent such lower alkyl radicals as methyl, ethyl, straight and branched propyl, butyl, amyl, and hexyl; these radicals can also represent such lower alkenyl radicals as vinyl, allyl, crotyl, butenyl, pentenyl, hexenyl, and the like.

The organic bases of the foregoing type form pharmaceutically acceptable non-toxic salts with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The heterocyclic ethers of this invention have valuable pharmacological properties. In particular, they are potent anti-emetic agents and act as tranquilizing agents in cases of hyperirritability and overstimulation of the central nervous system. Their advantage over other halophenothiazine derivatives used for these purposes consists in their very high degree of activity. This permits the use of a very small dose which produces minimal side effects. These ethers are also active as anti-inflammatory agents.

The compounds of this invention can be conveniently prepared by the condensation of haloalkyl phenothiazines of the type

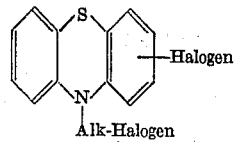

with an amine of the structural formula R—NH—Alk'—OR'.

An alternative method consists in the condensation of the halophenothiazine with an amine of the formula Halogen-Alk—NR—Alk'—O—R' in the presence of a condensing agent such as sodamide.

Still another alternative method uses as starting material compounds of the structural formula

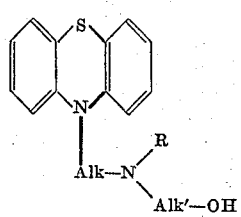

which are converted to the alkali metal derivative with an agent such as sodamide and then treated with an alkyl or alkenyl halide of the type R'-halogen.

The invention will appear more fully from a consideration of the following examples. However, it should be understood that these examples are given by way of illustration only and that the invention is not to be construed as limited in spirit or in scope by the details set forth therein. In these examples temperatures are given uncorrected in degrees centigrade (° C.), quantities in parts by weight, and pressures in millimeters of mercury.

*Example 1*

In cooled vessel 20.2 parts of chloromethyl methyl ether are treated by gradual addition with 100 parts of a 19% solution of methylamine in toluene. The reaction vessel is sealed and maintained at room temperature for 65 hours. The contents of the vessel are filtered. Ether can be used to rinse the filter cake. The filtrate is extracted with dilute hydrochloric acid. The acidic extract is washed with ether and rendered alkaline by addition of potassium carbonate under cooling. A considerable excess of potassium carbonate is used to cause separation of the oily base, which is collected after standing over the potassium carbonate solution for several hours.

A mixture of 7.4 parts of the N-methoxymethyl-N-methylamine thus obtained, 8.6 parts of 2-chloro-10-(γ-chloropropyl)phenothiazine, 4.2 parts of sodium iodide and 60 parts of butanone is heated at reflux for 6 hours and then concentrated under vacuum. The residue is dissolved in ether and water. The ether layer is separated, washed three times with water and then extracted with dilute hydrochloric acid. The extract is washed with ether and then rendered alkaline by the addition of 40% aqueous sodium hydroxide. The resulting base is extracted with ether and the ether extract is washed with water, dried over anhydrous sodium sulfate and filtered. On concentration there is obtained 2-chloro-10-(N'-methoxy-methyl-N'-methylaminopropyl)phenothiazine as an oil. This oil is dissolved in ether and acidified with a 25% solution of anhydrous hydrogen chloride in 2-propanol. On repeated treatment with ether and vacuum drying there is obtained the monohydrate of the hydrochloride of 2-chloro-10-(N'-methoxymethyl - N' - methylaminopropyl)phenothiazine. The base has the structural formula

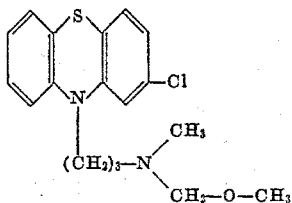

Example 2

In a sealed vessel a mixture of 12.8 parts of N-ethoxyethyl-N-methylamine, 6.2 parts of 2-chloro-10-(γ-chloropropyl)phenothiazine, 3 parts of sodium iodide and 80 parts of butanone is heated at 80° C. for 64 hours. The mixture is then concentrated under vacuum. The residue is taken up in ether, washed repeatedly with water and then extracted with dilute hydrochloric acid. The extract is washed with ether and rendered alkaline by addition of 40% aqueous sodium hydroxide solution and reextracted with a mixture of ether and benzene. This extract is washed with water, dried over anhydrous potassium carbonate, filtered and evaporated under vacuum to yield the 2-chloro-10-(N′-ethoxyethyl-N′-methylaminopropyl)phenothiazine as an oil which is distilled at about 170–180° C. and 0.02 mm. pressure in a short-path distillation apparatus. The compound thus obtained has the structural formula

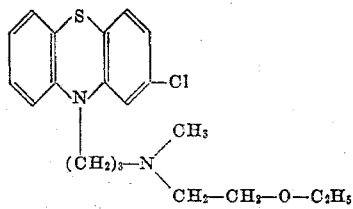

Example 3

Under cooling a solution of 110 parts of ethylamine in 470 parts of toluene is added portion-wise to 136 parts of δ-chlorobutyl ethyl ether. The resulting mixture is maintained in a sealed pressure reactor for 3 days at 80° C., and, then filtered. The filtrate is concentrated under vacuum, diluted with a small amount of ether and then extracted with dilute hydrochloric acid. The extract is rendered alkaline by addition of an excess of solid potassium carbonate whereupon the basic product separates which is then extracted with ether. The ether extract is dried over anhydrous potassium carbonate, filtered and evaporated to yield N-(δ-ethoxybutyl)-N-ethylamine.

A mixture of 43.5 parts of this amine, 300 parts of 2-chloro-10-(β-chloroethyl)phenothiazine and 450 parts of butanone is maintained in a pressure vessel for 1 day at 80° C. and then cooled and concentrated under vacuum. The residue is dissolved in ether and the ether extract is washed with water and extracted with dilute hydrochloric acid. This extract and all of the undissolved oily residue are washed with ether, made alkaline with potassium carbonate and extracted with ether. The resulting extract is washed with water, dried over anhydrous potassium carbonate, filtered and evaporated. The residue is submitted to a short-path vacuum distillation at about 0.01 mm. pressure with a bath temperature of 200–220° C. to yield 2-chloro-10-(N′-ethoxybutyl-N′-ethylaminoethyl)phenothiazine which has the structural formula

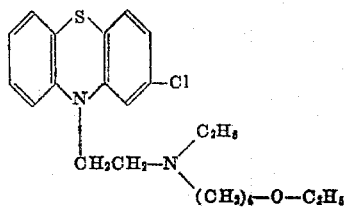

Example 4

13 parts of N-phenyl-4-fluoroanthranilic acid are heated to about 270° C. for 90 minutes and then dissolved in ether. The ether solution is washed with 2-N sodium hydroxide and with water and then dried over anhydrous sodium sulfate. After evaporation of the ether the residue is distilled at about 0.05 mm. pressure and 70° C. to yield m-fluorodiphenylamine as a colorless oil. A mixture of 3.7 parts of this oil, 1.3 parts of sulfur and 0.1 part of iodine are heated at 180–185° C. for an hour. The residue is sublimed in vacuum and then crystallized repeatedly from ethanol to yield 2-fluorophenothiazine melting at about 200–201° C.

A solution of 217 parts of 2-fluorophenothiazine in 550 parts of ether is treated under a nitrogen atmosphere by gradual addition with 64 parts of butyl lithium in 500 parts of ether. The mixture is stirred and then treated with 263 parts of δ-chlorobutyl p-toluenesulfonate and 200 parts of ether. After an hour of stirring, there is added a solution of 180 parts of concentrated hydrochloric acid in 300 parts of water, after which the hydrolyzed mixture is filtered. The organic layer is separated from the filtrate, washed with water and concentrated to yield 2-fluoro-10-(δ-chlorobutyl)phenothiazine.

Under cooling 100 parts of a 19% solution of methylamine in toluene is added portion-wise to 35 parts of β-chloroethyl butyl ether and the mixture is heated at 80° C. for 2.5 days. The isolation of the condensation product is caried out as in the foregoing example.

A mixture of 13 parts of the N-(β-butoxyethyl)-N-methylamine thus obtained, 100 parts of 2-fluoro-10-(δ-chlorobutyl)phenothiazine and 150 parts of butanone is heated in a bomb for 20 hours at 80° C. The contents of the bomb are then filtered and the filtrate is concentrated under vacuum. The residue is taken up in ether, washed with water and extracted with dilute hydrochloric acid. The acidic extract is washed with ether and then made alkaline by addition of 40% sodium hydroxide. The resulting mixture is reextracted with a mixture of ether and benzene. This extract is washed with water, dried over anhydrous potassium carbonate, filtered and concentrated under vacuum to yield a dark oil. Short-path distillation at about 0.02 mm. pressure yields, after a forerun, 2-fluoro-10-(N′-butoxyethyl-N′-methylaminoethyl)phenothiazine at about 200° C. The compound has the structural formula

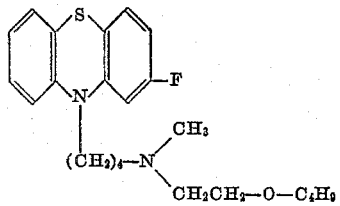

Substitution of an equivalent amount of 2-bromophenothiazine for the 2-fluorophenothiazine used in the foregoing procedure yields 2-bromo-10-(N′-butoxyethyl-N′-methylaminoethyl)phenothiazine which can be purified by short-path distillation at 0.01 mm. pressure at about 200–220° C. jacket temperature.

Example 5

Under cooling 26.6 parts of β-chloroethyl vinyl ether and 100 parts of a 19% solution of methylamine in toluene are mixed and then sealed in a pressure reactor and heated for 3 days at 80° C. The contents of the reactor are filtered and the filtrate is concentrated under vacuum, diluted with an equal weight of ether, and extracted with dilute hydrochloric acid. Treatment with additional solid potassium carbonate under cooling causes separation of the base which is then extracted with ether. The ether extract is dried over anhydrous potassium carbonate, filtered and distilled. After removal of the ether, the remaining fraction boiling below 100° C. is collected.

A mixture of 6.3 parts of the N-(β-vinyloxyethyl)-N-methylamine thus obtained with 4 parts of 2-chloro-10-(γ-iodopropyl)phenothiazine in 60 parts of butanone is heated in a shielded pressure reactor for 20 hours at 80° C., cooled and concentrated under vacuum. The residue is dissolved in ether, washed with water, and extracted with dilute hydrochloric acid. The extract and some undissolved oily material are combined, washed with ether and rendered alkaline with potassium carbonate. The resulting mixture is extracted with ether and the ether extract is washed with water, dried and concentrated under vacuum to yield the oily 2-chloro-10-(N'-(β-vinyloxyethyl)-N' - methylaminopropyl)phenothiazine, which has the structural formula

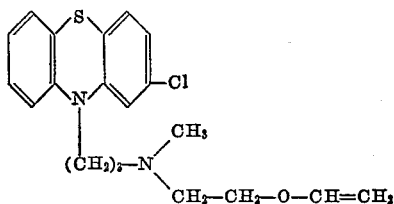

*Example 6*

Under a nitrogen atmosphere a solution of 65 parts of butyl lithium in 500 parts of ether is added gradually to a solution of 234 parts of 3-chlorophenothiazine in 550 parts of ether. After stirring for 30 minutes there is added a solution of 263 parts of δ-chlorobutyl p-toluenesulfonate in 250 parts of ether. This mixture is stirred for an hour and then hydrolyzed by addition of a solution of 180 parts of hydrochloric acid in 300 parts of water. The mixture is then filtered and the organic layer is separated, washed with ether and concentrated to yield 3-chloro-10-(δ-chlorobutyl)-phenothiazine.

A mixture of 106.5 parts of chloromethyl allyl ether and 180 parts of butylamine in 750 parts of toluene is heated in a closed vessel at 80° C. for 3 days after which the N-allyloxymethyl-N-butylamine is isolated by the procedure of Example 3.

A mixture of 14.5 parts of this amine, 110 parts of 3-chloro-10-(δ-chlorobutyl)phenothiazine and 150 parts of butanone is heated in a bomb for a day at 80° C. and then cooled, filtered and concentrated under vacuum. The residue is taken up in ether, washed with water and extracted with hydrochloric acid. The extract is washed with ether, rendered alkaline by addition of 40% aqueous sodium hydroxide and again extracted with a mixture of benzene and ether. The resulting extract is washed with water, dried over anhydrous potassium carbonate, filtered and concentrated under vacuum. The residual oil is subjected to short-path distillation at about 0.01 mm. pressure. After a forerun there is obtained at about 200° C. jacket temperature 3-chloro-10-(N'-methoxymethyl-N'-butylaminopropyl)phenothiazine which has the structural formula

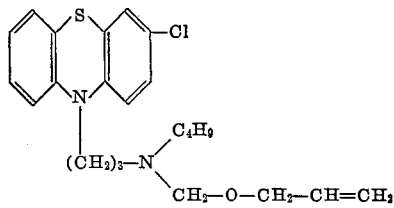

If the same reaction is carried out using 2-chlorophenothiazine instead of 3-chlorophenothiazine there is obtained 2-chloro-10-(N'-methoxymethyl - N' - butylaminopropy)phenothiazine which can be purified by short-path distillation at about 0.02 mm. pressure and 200–210° C. jacket temperature.

*Example 7*

A mixture of 2.9 parts of N-methoxymethyl-N-allylamine, 6.2 parts of 2-chloro-10-(γ-chloropropyl)phenothiazine, 60 parts of butanone and 2 parts of pyridine is heated at reflux for 4 hours and then concentrated under vacuum. The residue is dissolved in a mixture of ether and water. The ether layer is separated, washed repeatedly with water and then extracted with dilute hydrochloric acid. The acid extract is washed with ether and then rendered alkaline by addition of a 40% solution of aqueous sodium hydroxide. The alkaline material is reextracted with ether, washed with water, dried over anhydrous potassium carbonate and concentrated under vacuum. The resulting oil is subjected to a short-path distillation at 0.01 mm. pressure and, after a forerun of low boiling material, 2-chloro-10-(N'-methoxymethyl-N'-allylaminopropyl)phenothiazine is collected as a viscous oil, the jacket temperature being at about 200–220° C. The compound has the structural formula

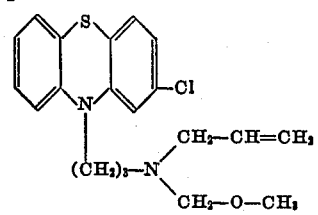

What is claimed is:
1. A compound of the structural formula

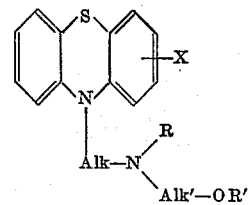

wherein Alk and Alk' are lower alkylene radicals, R and R' are members of the class consisting of lower alkyl and lower alkenyl radicals, and X is a halogen atom of atomic weight less than 100.

2. A compound of the structural formula

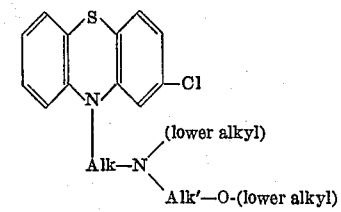

wherein Alk and Alk' are lower alkylene radicals.

3. A compound of the structural formula

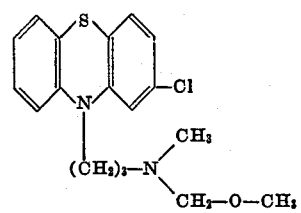

4. A compound of the structural formula

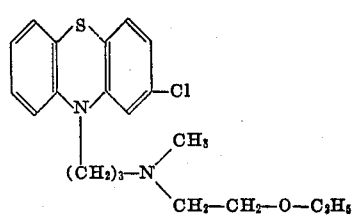

5. A compound of the structural formula
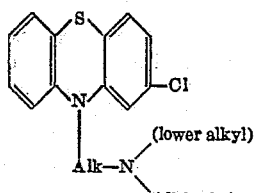
wherein Alk and Alk' are lower alkylene radicals.
6. A compound of the structural formula
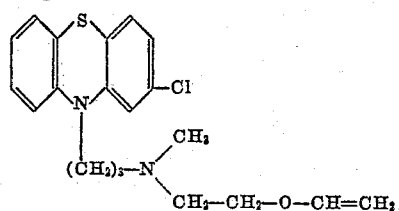
References Cited in the file of this patent
UNITED STATES PATENTS
2,512,520     Cusic _____ June 20, 1950